(12) United States Patent
Snider

(10) Patent No.: US 8,011,251 B1
(45) Date of Patent: Sep. 6, 2011

(54) BIFURCATED PRESSURE INSTRUMENTATION RAKE

(75) Inventor: Zachary John Snider, Greenville, SC (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 12/730,278

(22) Filed: Mar. 24, 2010

(51) Int. Cl.
*G01L 7/00* (2006.01)
(52) U.S. Cl. .......................................... 73/714
(58) Field of Classification Search .............. 73/714, 73/170.02, 700, 756, 866.5, 112.01, 112.05
See application file for complete search history.

(56) References Cited

U.S. PATENT DOCUMENTS
6,595,062 B1 * 7/2003 Luke et al. ...................... 73/714
* cited by examiner

*Primary Examiner* — Jewel V Thompson
(74) *Attorney, Agent, or Firm* — Sutherland Asbill & Brennan LLP

(57) ABSTRACT

The present application provides an instrumentation rake for use with a number of flow paths. The instrumentation rake may include a manifold, a first rake body connected to the manifold, and a second rake body connected to the manifold. A number of first rake body aspirators may be positioned about the first rake body and in communication with a first flow path and a number of second rake body aspirators may be positioned about the second rake body and in communication with a second flow path.

20 Claims, 5 Drawing Sheets

BIFURCATED PRESSURE INSTRUMENTATION RAKE

TECHNICAL FIELD

The present application relates generally to gas turbine engine components and more particularly relates to a bifurcated pressure instrumentation rake used about a compressor exit diffuser and elsewhere.

BACKGROUND OF THE INVENTION

Control systems for modem gas turbine engines measure internal conditions at various positions within the air and the gas paths therethrough. Air pressure and temperature measurements may be made by through the use of Pitot tubes, thermocouples, and other devices positioned within the compressor and elsewhere. One known pressure device is a Kiel probe. Generally described, a Kiel probe is a shrouded Pitot tube that is not sensitive to changes in yaw angle. An example of a Kiel probe is offered by United Sensor Corporation of Amherst, N.H. Other types of temperature and pressures probes are known.

In the absence of suitable hardware, the sensors may be slotted into the compressor or other location on rakes. Rakes are generally mounted onto a machined surface within the compressor and elsewhere. Such machined surfaces, however, may be expensive to manufacture. Moreover, in certain turbine components such as in a diffuser, it may be difficult to find enough space for the number of desired rakes. This may be particularly true in a split diffuser used in gas turbine engines such as that offered by General Electric Company of Schenectady, N.Y. under the designation 7FA-05. Such a gas turbine engine provides a split diffuser with limited room for the positioning of the rakes and other types of instrumentation.

There is thus a desire for an improved instrumentation rake and the like. Such an improved instrumentation rake would accurately measure temperature and/or pressure while requiring less space and machined surfaces within the compressor or elsewhere as compared to known rakes.

SUMMARY OF THE INVENTION

The present application therefore provides an improved instrumentation rake for use with a number of flow paths. The instrumentation rake may include a manifold, a first rake body connected to the manifold, and a second rake body connected to the manifold. A number of first rake body aspirators may be positioned about the first rake body and in communication with a first flow path and a number of second rake body aspirators may be positioned about the second rake body and in communication with a second flow path.

The present application further provides for a split diffuser. The split diffuser may include a first flow path, a second flow path, and a divider positioned between the first flow path and the second flow path. An instrumentation rake may be positioned about the divider. The instrumentation rake may include a first rake body positioned about the first flow path and a second rake body positioned about the second flow path.

These and other features and improvements of the present application will become apparent to one of ordinary skill in the art upon review of the following detailed description when taken in conjunction with the several drawings and the appended claims.

DETAILED DESCRIPTION

Figure 1:
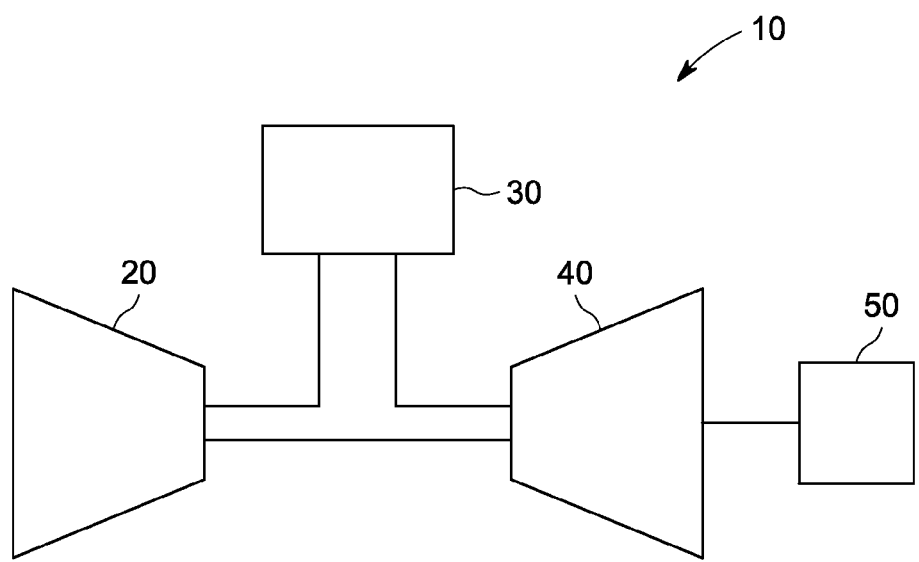
FIG. 1 is a schematic view of a gas turbine engine.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. Although only a single combustor 30 is shown, the gas turbine engine 10 may include any number of combustors 30. The hot combustion gases are in turn delivered to a turbine 40. The hot combustion gases drive the turbine 40 so as to produce mechanical work. Mechanical work produced in the turbine 40 drives the compressor 20 and an external load 50 such as an electrical generator and the like. The gas turbine engine 10 may use natural gas, various types of syngas, and other types of fuels. Other types of gas turbine engine configurations may be used herein.

Figure 2:
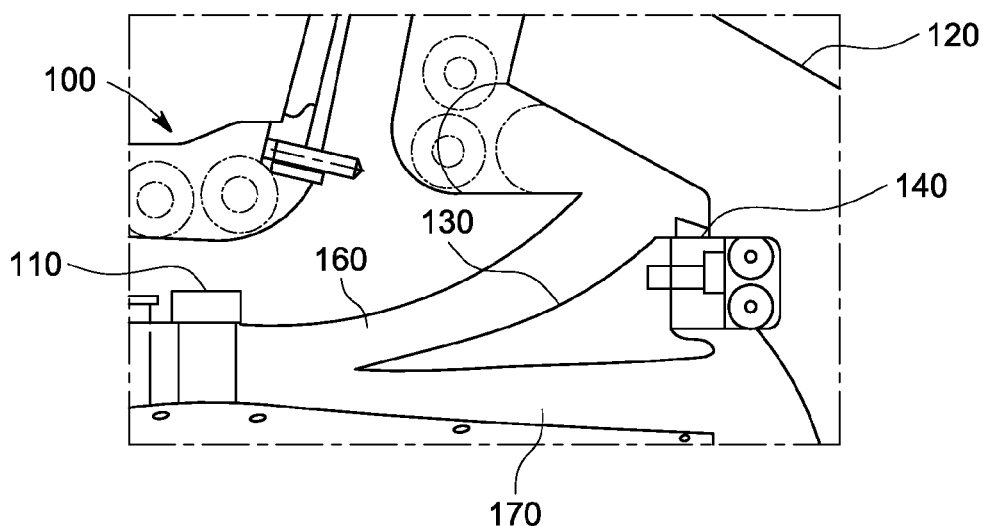
FIG. 2 is a side cross-sectional view of a portion of a split diffuser.

As described above, the 7FA-05 gas turbine offered by General Electric Company of Schenectady, N.Y. includes a split diffuser 100. As is shown in FIG. 2, the split diffuser 100 may be positioned downstream of the last stage 110 of the compressor 20 and may extend towards a transition piece 120 of the combustor 30 and towards the turbine 40. Other configurations may be used herein. A divider 130 may be attached to a bullhorn bracket ring 140 and a number of bullhorn fingers 150 or otherwise. The bullhorn bracket ring 140 and the bullhorn fingers 150 may extend towards and about the transition piece 120. The divider 130 divides an incoming air stream into a first stream 160 and a second stream 170.

Figure 3:
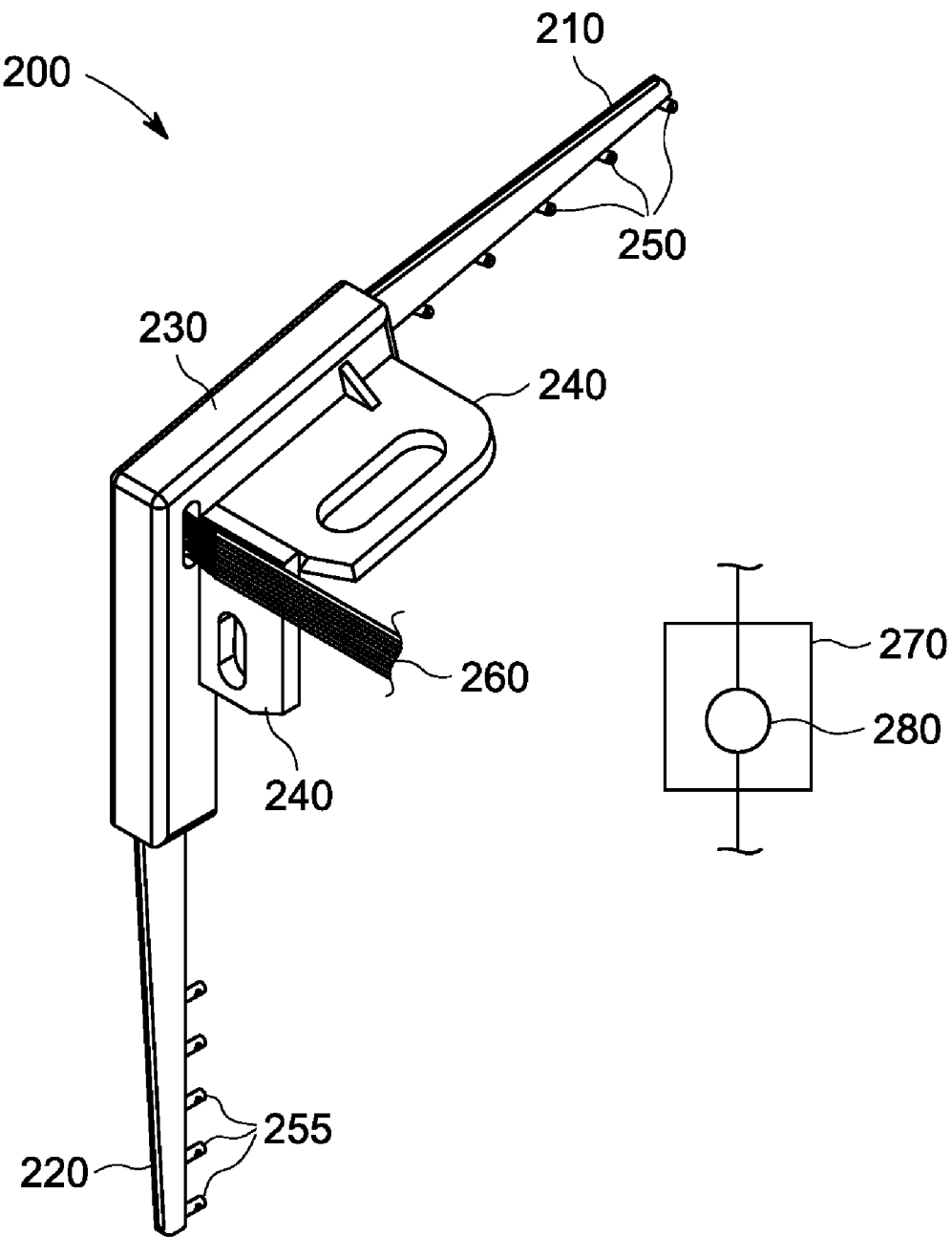
FIG. 3 is a perspective view of an instrumentation rake as is described herein.
Figure 4:
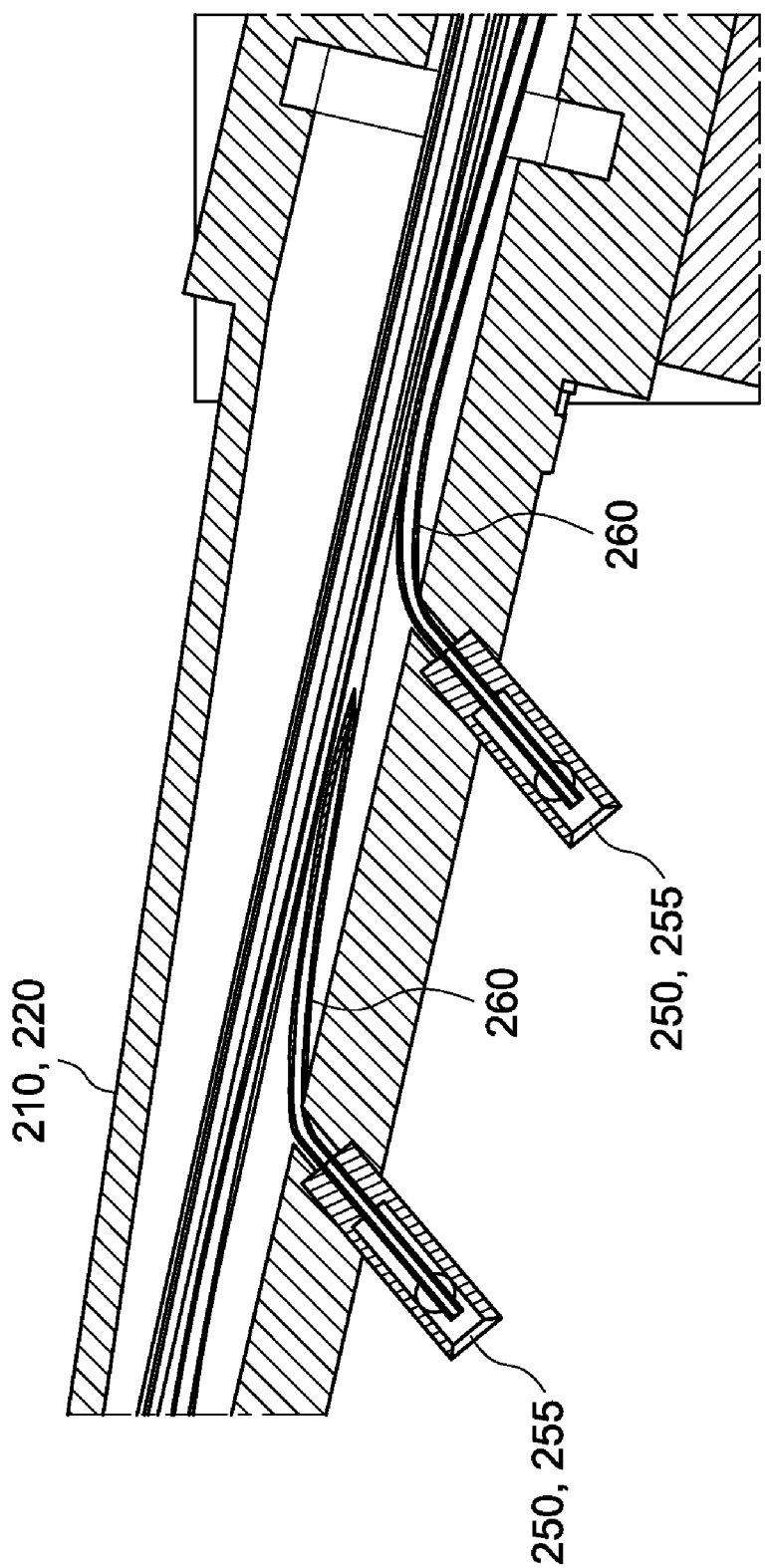
FIG. 4 is a side view of the instrumentation rake of FIG. 3.

FIGS. 3 and 4 show an example of an instrumentation rake 200 as may be described herein. The instrumentation rake 200 may be a pressure sensor similar to the Kiel probe described above. In this example, the instrumentation rake 200 includes a pair of rake bodies, a first rake body 210 and a second rake body 220. The rake bodies 210, 220 may be reinforced through the use of cantilevered surfaces. Other shapes may be used herein. More than two rake bodies 210, 220 may be used herein. The rake bodies 210, 220 may be mounted about a central manifold 230 or otherwise. A number of flanges 240 may be positioned about the central manifold 230 for mounting the instrumentation rake 200 as will be described in more detail below. The instrumentation rake 200 may have any desired overall size or shape.

The rake bodies 210, 220 each may have a number of aspirators, in this case a number of first body aspirators 250 and a number of second body aspirators 255 positioned thereon. Any number, size, or shape of the aspirators 250, 255 may be used herein. A tube 260 may be in communication with each aspirator 250, 255. The tubes 260 may have any size or shape. The tubes 260, in turn, may be in communication with a control system 270 positioned outside of the diffuser 100 or otherwise. The control system 270 may house a number of pressure transducers 280 or other type of pressure sensor to convert the sensed pressure to an electrical signal.

Other configurations may be used herein. Likewise, other types of sensors or combinations thereof may be used herein.

Figure 5:
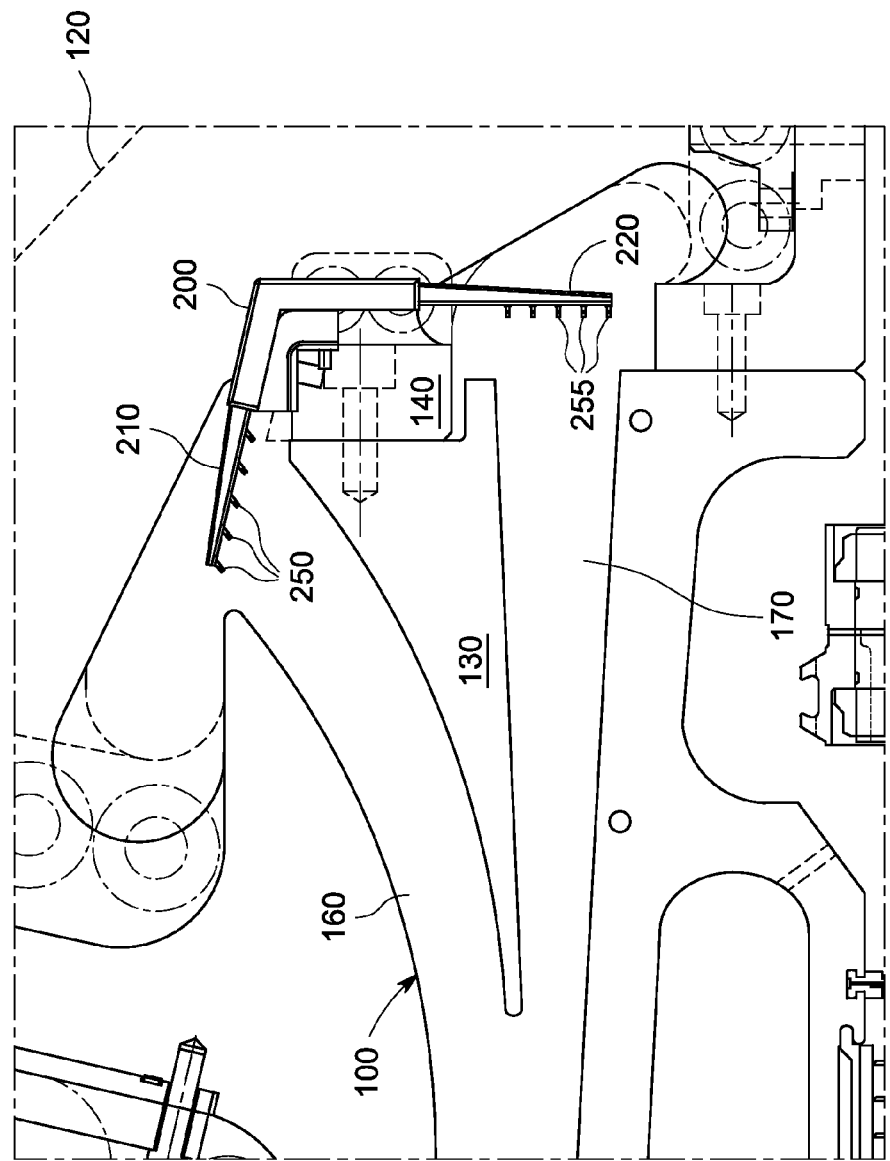
FIG. 5 is a side plan view of the instrumentation rake of FIG. 3 as positioned within the split diffuser.
Figure 6:
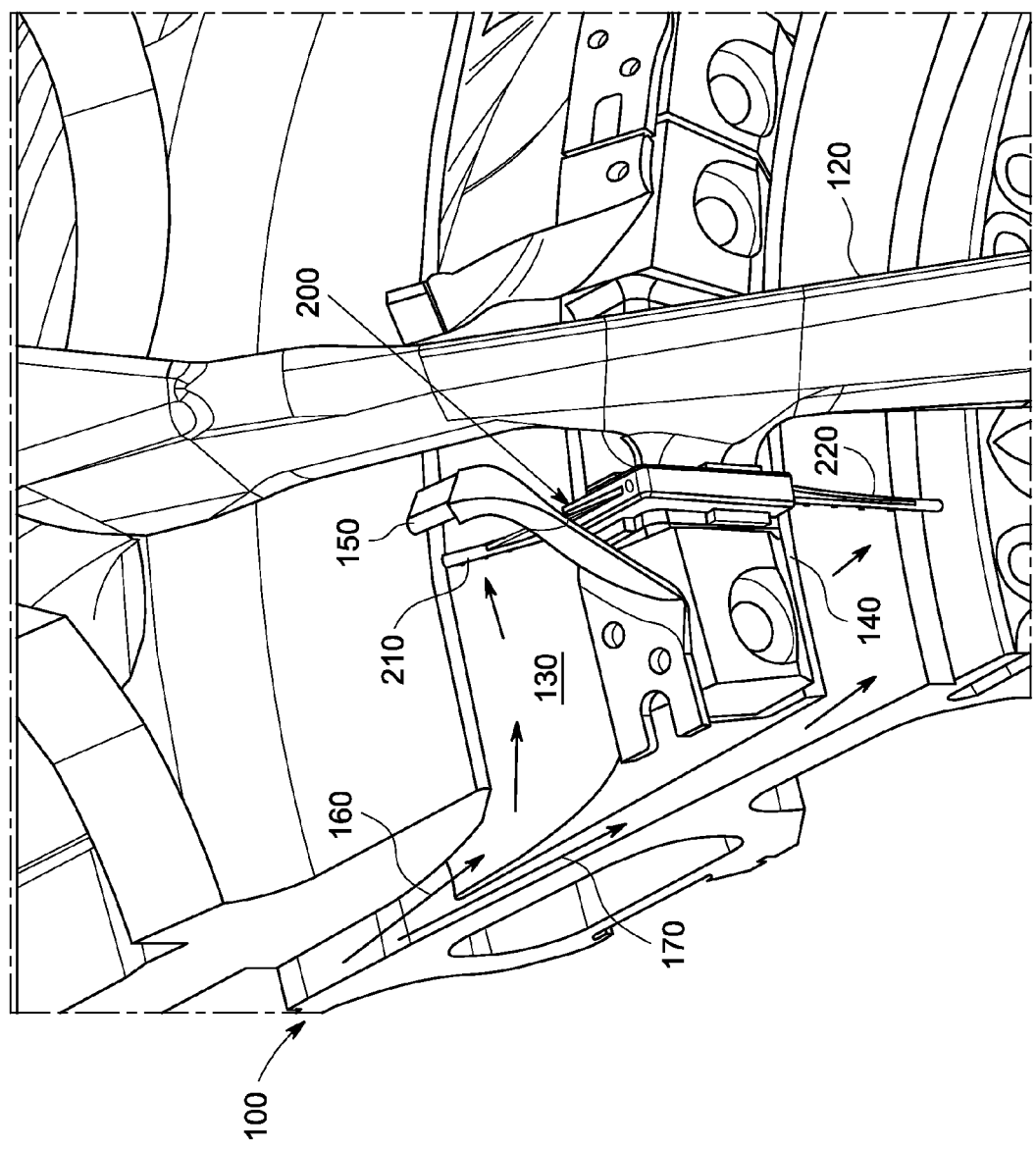
FIG. 6 is a top perspective view of the instrumentation rake of FIG. 3 positioned within the split diffuser.

FIGS. 5 and 6 show the mounting of the instrumentation rake 200 within the diffuser 100. In this example, the instrumentation rake 200 may be positioned about the bullhorn bracket ring 140 and beneath the bullhorn fingers 150 and the transition piece 120. As is shown, the first rake body 210 may be positioned about the first air stream 160 while the second rake body 220 may be positioned about the second stream 170 or otherwise. Other locations may be used herein.

The instrumentation rake 200 thus may measure both air streams 160, 170 of the diffuser 100 whereas two individual rakes were required previously. As such, half of the number of machined surfaces will be required for mounting. Moreover, the instrumentation rake 200 also may be mounted about the bullhorn fingers 150 or elsewhere so as to reduce even further the machining costs.

The instrumentation rake 200 thus may be mounted just about anywhere about the split diffuser 100 or otherwise within the gas turbine engine 10 as a whole at half the cost of known rakes. In fact, the instrumentation rake 200 may be mounted about any type of air flows. Likewise, overall manufacturing and machining costs may be reduced.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. An instrumentation rake for use with a number of flow paths, comprising:
   a manifold;
   a first rake body connected to the manifold;
   a plurality of first rake body aspirators positioned about the first rake body and in communication with a first flow path;
   a second rake body connected to the manifold;
   a plurality of second rake body aspirators positioned about the second rake body and in communication with a second flow path; and
   a plurality of tubes in communication with the plurality of first rake body aspirators and the plurality of second rake body aspirators.

2. The instrumentation rake of claim 1, further comprising a plurality of pressure transducers in communication with the plurality of tubes.

3. The instrumentation rake of claim 1, wherein the manifold comprises one or more mounting flanges.

4. The instrumentation rake of claim 1, wherein the first flow path and the second flow path define a split diffuser.

5. The instrumentation rake of claim 4, wherein the split diffuser comprises a divider positioned between the first flow path and the second flow path.

6. The instrumentation rake of claim 1, wherein the instrumentation rake comprises a pressure rake.

7. A split diffuser, comprising:
   a first flow path;
   a second flow path;
   a divider positioned between the first flow path and the second flow path; and
   an instrumentation rake positioned about the divider;
   the instrumentation rake comprising a first rake body positioned about the first flow path and a second rake body positioned about the second flow path; and
   wherein the instrumentation rake is positioned about a bullhorn bracket ring.

8. The split diffuser of claim 7, wherein the instrumentation rake comprises a manifold connected to the first rake body and the second rake body.

9. The split diffuser of claim 8, wherein the instrumentation rake comprises one or more mounting flanges connected to the manifold.

10. The split diffuser of claim 7, wherein the first rake body comprises a plurality of first rake body aspirators and the second rake body comprises a plurality of first rake body aspirators.

11. The split diffuser of claim 10, further comprising a plurality of tubes in communication with the plurality of first rake body aspirators and the plurality of second rake body aspirators.

12. The split diffuser of claim 11, further comprising a plurality of pressure transducers in communication with the plurality of tubes.

13. The split diffuser of claim 7, wherein the instrumentation rake comprises a pressure rake.

14. The split diffuser of claim 7, further comprising a control in communication with the instrumentation rake.

15. A split diffuser, comprising:
    a first flow path;
    a second flow path;
    a divider positioned between the first flow path and the second flow path; and
    an instrumentation rake positioned about the divider;
    the instrumentation rake comprising a first rake body positioned about the first flow path and a second rake body positioned about the second flow path; and
    wherein the instrumentation rake is positioned on or below a bullhorn finger.

16. The split diffuser of claim 15, wherein the instrumentation rake comprises a manifold connected to the first rake body and the second rake body.

17. The split diffuser of claim 16, wherein the instrumentation rake comprises one or more mounting flanges connected to the manifold.

18. The split diffuser of claim 15, wherein the first rake body comprises a plurality of first rake body aspirators and the second rake body comprises a plurality of first rake body aspirators.

19. The split diffuser of claim 15, wherein the instrumentation rake comprises a pressure rake.

20. The split diffuser of claim 15, further comprising a control in communication with the instrumentation rake.

* * * * *